US010596557B2

(12) United States Patent
Sun et al.

(10) Patent No.: US 10,596,557 B2
(45) Date of Patent: Mar. 24, 2020

(54) METHOD FOR PREPARING MOLECULAR SIEVE-MULTIELEMENT OXIDE COMPOSITE INTEGRALLY EXTRUDED DENITRATION CATALYST

(71) Applicant: VALIANT CO., LTD., Yantai, Shandong (CN)

(72) Inventors: Li Sun, Shandong (CN); Yongzhen Xu, Shandong (CN); Quansheng Li, Shandong (CN); Xiaoling Liu, Shandong (CN); Baohua Hu, Shandong (CN); Ming Cui, Shandong (CN); Yingjie Tang, Shandong (CN); Yuchang Wang, Shandong (CN); Zhenlei Zhou, Shandong (CN)

(73) Assignee: Valiant Co., Ltd., Yantai, Shandong (CN)

( * ) Notice: Subject to any disclaimer, the term of this patent is extended or adjusted under 35 U.S.C. 154(b) by 0 days.

(21) Appl. No.: 16/087,229

(22) PCT Filed: Dec. 27, 2016

(86) PCT No.: PCT/CN2016/112491
§ 371 (c)(1),
(2) Date: Sep. 21, 2018

(87) PCT Pub. No.: WO2018/113004
PCT Pub. Date: Jun. 28, 2018

(65) Prior Publication Data
US 2019/0046962 A1   Feb. 14, 2019

(30) Foreign Application Priority Data
Dec. 23, 2016   (CN) .......................... 2016 1 1209429

(51) Int. Cl.
*B01J 29/06* (2006.01)
*B01J 29/24* (2006.01)
(Continued)

(52) U.S. Cl.
CPC .......... *B01J 29/24* (2013.01); *B01D 53/8628* (2013.01); *B01J 23/002* (2013.01); *B01J 29/072* (2013.01); *B01J 29/076* (2013.01); *B01J 29/143* (2013.01); *B01J 29/146* (2013.01); *B01J 29/166* (2013.01); *B01J 29/26* (2013.01); *B01J 29/46* (2013.01); *B01J 29/48* (2013.01); *B01J 29/7065* (2013.01); *B01J 29/76* (2013.01); *B01J 29/763* (2013.01); *B01J 29/7615* (2013.01); *B01J 29/78* (2013.01); *B01J 29/783* (2013.01); *B01J 29/7815* (2013.01); *B01J 29/80* (2013.01); *B01J 29/83* (2013.01); *B01J 29/85* (2013.01); *B01J 35/04* (2013.01); *B01J 35/06* (2013.01); *B01J 37/0009* (2013.01); *B01J 37/009* (2013.01); *B01J 37/0018* (2013.01); *B01J 37/0036* (2013.01); *B01J 37/0045* (2013.01); *B01J 37/03* (2013.01); *B01J 37/04* (2013.01); *B01J 37/06* (2013.01); *B01J 37/088* (2013.01); *B01J 37/30* (2013.01); *B01D 2255/2065* (2013.01); *B01D 2255/2073* (2013.01); *B01D 2255/20707* (2013.01); *B01D 2255/20738* (2013.01); *B01D 2255/20746* (2013.01); *B01D 2255/20753* (2013.01); *B01D 2255/20761* (2013.01); *B01D 2255/50* (2013.01); *B01D 2255/502* (2013.01); *B01D 2255/504* (2013.01);
(Continued)

(58) Field of Classification Search
CPC . B01J 29/166; B01J 29/76; B01J 29/80; B01J 29/83; B01J 29/072; B01J 29/076; B01J 29/7065; B01J 29/24; B01J 29/146; B01J 29/78; B01J 29/26; B01J 29/143; B01J 29/48; B01J 29/7615; B01J 29/46; B01J 29/763; B01J 29/7815; B01J 29/783; B01J 29/85; B01J 23/002; B01J 21/063; B01J 21/066; B01J 35/04; B01J 35/06; B01J 35/023; B01J 35/026; B01J 37/30; B01J 37/04; B01J 37/06; B01J 37/03; B01J 37/088; B01J 37/0045; B01J 37/0018; B01J 37/0036; B01J 37/009; B01J 2229/20; B01J 2229/186; B01D 53/8628; B01D 2255/50; B01D 2255/502; B01D 2255/504; B01D 2255/20746; B01D 2255/2073; B01D 2255/20707; B01D 2255/2065; B01D 2255/20738; B01D 2255/20753; B01D 2255/20761; B01D 2258/0283
USPC ........ 502/60, 64, 65, 66, 67, 68, 69, 70, 71, 502/73, 74, 77, 78, 79, 439, 506
See application file for complete search history.

(56) References Cited

U.S. PATENT DOCUMENTS

| | | | |
|---|---|---|---|
| 2014/0113802 A1* | 4/2014 | Yu ........................... | B01J 23/30 502/84 |
| 2016/0136626 A1* | 5/2016 | Phillips .............. | B01D 53/9477 423/239.2 |

* cited by examiner

*Primary Examiner* — Elizabeth D Wood
(74) *Attorney, Agent, or Firm* — Liang Legal Group, PLLC (57) ABSTRACT

A preparation method for a molecular sieve-multiple oxide composite integral extrusion type denitration catalyst includes constructing an organic structure coating on the surface of a metal ion-exchanged molecular sieves and synchronously adding multiple oxide components, thus obtaining an ion-exchanged molecular sieve-multiple oxide composite denitration catalyst active component; and then mixing, kneading into paste, staling, carrying out integral extrusion forming, drying, and calcining, thus obtaining the integral extrusion type denitration catalyst. The molecular sieve-multiple oxide composite integral extraction type denitration catalyst has a denitration efficiency more than

(Continued)

80% at the temperature ranging from 250° C. to 420° C. in the presence of 10% steam and 500 ppm sulfuric dioxide.

10 Claims, 1 Drawing Sheet

(51) Int. Cl.
    *B01J 29/26*     (2006.01)
    *B01J 29/14*     (2006.01)
    *B01J 29/48*     (2006.01)
    *B01J 29/76*     (2006.01)
    *B01J 29/78*     (2006.01)
    *B01J 29/85*     (2006.01)
    *B01J 37/30*     (2006.01)
    *B01J 37/04*     (2006.01)
    *B01J 37/06*     (2006.01)
    *B01J 37/00*     (2006.01)
    *B01D 53/86*     (2006.01)
    *B01J 29/46*     (2006.01)
    *B01J 23/00*     (2006.01)
    *B01J 29/072*     (2006.01)
    *B01J 35/04*     (2006.01)
    *B01J 35/06*     (2006.01)
    *B01J 29/70*     (2006.01)
    *B01J 29/16*     (2006.01)
    *B01J 37/03*     (2006.01)
    *B01J 29/076*     (2006.01)
    *B01J 29/83*     (2006.01)
    *B01J 37/08*     (2006.01)
    *B01J 29/80*     (2006.01)
    *B01J 35/02*     (2006.01)

(52) U.S. Cl.
    CPC ..... *B01D 2258/0283* (2013.01); *B01J 35/023* (2013.01); *B01J 35/026* (2013.01); *B01J 2229/186* (2013.01); *B01J 2229/20* (2013.01); *B01J 2523/00* (2013.01)

ically high due to the shortage of vanadium ore reserves. Therefore, the development of vanadium-free environment-friendly denitration catalysts with high resistance to water and sulfur poisoning is a hot issue both in academia and industrial circle at home and abroad.

METHOD FOR PREPARING MOLECULAR SIEVE-MULTIELEMENT OXIDE COMPOSITE INTEGRALLY EXTRUDED DENITRATION CATALYST

BACKGROUND OF THE INVENTION

Technical Field

The present invention relates to a preparation method for a molecular sieve-multiple oxide composite integral extrusion type denitration catalyst, in particular to a preparation method for a vanadium-free ion-exchanged molecular sieve-multiple oxide composite denitration catalyst, belonging to the technical fields of atmosphere pollution control and environment-friendly catalytic materials.

Description of Related Art

Nitrogen oxide (NOx) pollutants come mainly from stationary sources such as coal-fired power plants and industrial boilers, as well as mobile sources such as motor vehicle emissions. NOx, the basis of nitric acid-based acid rain and one of the main substances that form photochemical smog, cause the greenhouse effect and destroy the ozone layer and have a strong poisoning effect on the human body, environment, and ecology. With the rapid development of the domestic economy, the coal-dominated energy structure has led to a rapid increase in the emission of NOx pollutants and seriously polluted the ecological environment, which has become one of the important factors restricting social and economic development.

Ammonia selective catalytic reduction ($NH_3$-SCR) is currently the most effective NOx emission control technology, which is widely used in flue gas denitration of stationary sources, such as coal-fired power plants and industrial boilers. This technology has the advantages of high denitration efficiency, good selectivity, reliable operation, easy maintenance, and so on. Now, it has become one of the most widely used and most mature and effective flue gas denitration technologies in the world. The catalyst is the core part of an $NH_3$-SCR system and the key to the success or failure of a denitration project. At present, a catalyst system for industrial application mainly refers to $V_2O_5$—$WO_3$ ($MoO_3$)—$TiO_2$, in which anatase titanium dioxide is one of the main raw materials used for industrial production of SCR denitration catalysts due to its good resistance to sulfur poisoning and rich Lewis acid sites on the surface. Anatase titanium dioxide is also the primary factor controlling the performance and cost of catalysts. Despite technologies for production and application of vanadium-based catalysts with good medium- and high-temperature activity and sulfur poisoning resistance, $V_2O_5$ belongs to highly toxic substances, and large-scale use of such catalysts may endanger human health and cause environmental pollution issues. Moreover, the price of vanadium oxides is relatively high due to the shortage of vanadium ore reserves. Therefore, the development of vanadium-free environment-friendly denitration catalysts with high resistance to water and sulfur poisoning is a hot issue both in academia and industrial circle at home and abroad.

Metal-loaded molecular sieve denitration catalysts have become a new focus of research on SCR catalysts due to their wide operation temperature window, good hydrothermal stability at high-temperature and low sulfur dioxide oxidation rate, and have been commercialized for mobile sources $NO_x$ emission control. Metals that are loaded on the molecular sieve denitration catalysts by an ion-exchange/impregnation method usually include Mn, Fe, Co, Ni, Cu, Ce etc., and molecular sieve catalysts loaded with Mn, Fe, Cu and Ce show the best catalytic activities. However, steam and sulfur dioxide generally have a significant negative impact on the activity of a molecular sieve-based denitration catalyst. Steam can collapse the molecular sieve structure at high temperature by de-aluminating, migrating and transforming the active components, thereby causing deactivation of the catalytic activity. The catalyst is subject to sulfur dioxide poisoning mainly in two ways: sulfation of active metals and deposition of ammonium sulphate/ammonium bisulfate to cover the active sites. The drawbacks of water and sulfur poisoning resistance of metal-loaded molecular sieves limit their industrial application in the stationary sources flue gas denitration. Therefore, it is of great practical importance to improve water and sulfur poisoning resistance of metal-loaded molecular sieve denitration catalysts and to develop vanadium-free environment-friendly denitration catalysts by optimizing the preparation process.

SUMMARY OF THE INVENTION

Aiming at the defects in the prior art in the application of metal-loaded molecular sieves in denitration catalysts for the stationary sources flue gas treatments, embodiments of the present invention aim to provide preparation methods for molecular sieve-multiple oxide composite integral extrusion type denitration catalysts. According to embodiments of the present invention, by constructing an ion-exchanged molecular sieve-multiple oxide composite active component using a surfactant and a pore-forming agent, selecting an anti-sulfur titanium-based support, and adding an inorganic binder, and the like, the preparation costs of the denitration catalysts are reduced, the synergistic effects of the active components and the supports are enhanced, and the mechanical strength of the integral extrusion type catalyst is improved. The integral extrusion-type denitration catalysts prepared according to embodiments of the present invention have a wide operation temperature window, high denitration efficiencies, and strong resistance to water and sulfur poisoning. These catalysts can be used as flue gas denitration catalysts for stationary sources, such as industrial boilers and power plants.

According to embodiments of the invention, a technical solution adopted to solve the above-mentioned problems is as follows: a preparation method for a molecular sieve-multiple oxide composite integral extrusion type denitration catalyst, comprising the steps of:

(1) mixing a metal salt solution of one or two selected from manganese, iron, cobalt, nickel, copper, or cerium with molecular sieves; and after an ion exchange reaction, adding a surfactant and simultaneously carrying out shear emulsification and dispersion treatment to obtain an ion-exchanged molecular sieve slurry;

(2) preparing an acidic precursor solution from a mixture of a metal salt of one or two selected from manganese, iron, cobalt, nickel, copper, or cerium, and one or more of an aluminum source, a titanium source, or a zirconium source; preparing an alkaline precursor solution from an alkaline silicon source; and mixing the acidic precursor solution and the alkaline precursor solution uniformly to obtain a mixed solution or slurry;

(3) adding an alkaline compound solution into the mixed solution or slurry obtained in step (2) to adjust the pH value of the mixed solution or slurry to alkaline; adding a pore-forming agent; and carrying out an aging reaction, filtering, washing with water and filtrate removal to obtain a filter cake, which is a multi-oxide precursor;

(4) adding the ion-exchanged molecular sieve slurry obtained in step (1) into the multi-oxide precursor obtained in step (3); stirring and mixing, and then carrying out vacuum dewatering, drying and high-temperature calcining to obtain a molecular sieve-multiple oxide composite denitration catalyst active component;

(5) pulverizing and sieving the composite denitration catalyst active component obtained in step (4); then mixing it with a titanium-based support, an inorganic binder, an organic binder, a structure enhancer, a molding pore-forming agent, a lubricant, and water; kneading into paste; staling/aging; and carrying out integral extrusion molding, drying and calcining to obtain an integral (unitary) extrusion-type denitration catalyst.

Based on the foregoing technical solution, embodiments of the present invention may also be improved in the following ways.

Preferably, in step (1), the metal salt of one or two selected from manganese, iron, cobalt, nickel, copper, or cerium is one of a soluble metal acetate, a metal nitrate, a metal sulfate, or a metal hydrochloride; the mass of the one or two of manganese, iron, cobalt, nickel, copper, or cerium in the metal salt is 0.5%-8% of the mass of the molecular sieves. The framework topological structure of the molecular sieves is AEI, AFX, BEA, CHA, DDR, ERI, FAU, FER, GIS, KFI, LEV, LTA, MEL, MFI, MOR, PAU, SAS, or a mixture thereof. The liquid-solid mass ratio of the metal salt solution to the molecular sieves is 2-50:1. The ion exchange reaction is carried out at 25° C.-95° C. and lasts for 0.5-8 h. The surfactant is a cationic surfactant, an anionic surfactant, or a nonionic surfactant. The surfactant has a concentration of 0.5%-10% by mass, and the shear emulsification dispersion treatment lasts for 10-40 min.

Adoption of the above-mentioned provides further beneficial effects that the framework topological structures of the molecular sieves conform to structure codes defined by IZA (International Zeolite Association).

Preferably, in the metal salt solution of two selected from manganese, iron, cobalt, nickel, copper, or cerium, the molar ratio of the two metal atoms is (0.05-1):(0.05-1).

Preferably, the metal salt is one or two selected from manganese, iron, copper, or cerium metal salts, and the mass of metal in the manganese, iron, copper, or cerium metal salts is 2-4% of the mass of the molecular sieves; the liquid-solid mass ratio of the metal salt solution to the molecular sieves is 5-10:1; the ion exchange is carried out at 50-80° C. and lasts for 2-5 h; the surfactant has a mass concentration of 2%-5%.

Preferably, the molecular sieve is an aluminosilicate molecular sieve, a silicoaluminophosphate molecular sieve, or an aluminum phosphate molecular sieve; and the type of the molecular sieve is one of a hydrogen type molecular sieve, an ammonium type molecular sieve, an alkali metal type molecular sieve, or an alkaline earth metal type molecular sieve.

Preferably, the molar ratio of $SiO_2$ to $Al_2O_3$ in the aluminosilicate molecular sieves is 5-100; the mass fraction of silicon in the silicoaluminophosphate molecular sieves is 1%-25%; and the type of the molecular sieve is a hydrogen type molecular sieve.

Preferably, the molar ratio of $SiO_2$ to $Al_2O_3$ in the aluminosilicate molecular sieves is 10-40; the mass fraction of silicon in the silicoaluminophosphate molecular sieves is 5%-15%.

Preferably, the topology of the molecular sieves is one or more of SAPO-18, SSZ-39, SAPO-56, SSZ-16, Zeolite Beta, SAPO-34, SSZ-13, SAPO-44, ZSM-58, ZSM-34, Zeolite X, Zeolite Y, SAPO-37, ZSM-35, Zeolite P, SAPO-43, ZK-5, SAPO-35, Zeolite A, ZSM-11, ZSM-5, Zeolite Mordenite, ECR-18, or SSZ-73; the cationic surfactant is a quaternary ammonium salt; the anionic surfactant is a carboxylate, a sulfate, a sulfonate, or a phosphate; and the nonionic surfactant is a long-chain alkane epoxy ethylene ether, a long-chain phenol epoxy ethylene ether, an sorbitan ester, or a polyethylene oxide-polypropylene oxide block copolymer.

Preferably, the topology of the molecular sieves is one or two of SSZ-39, SSZ-16, Zeolite Beta, SAPO-34, SSZ-13, Zeolite Y, ZSM-5, and/or Zeolite Mordenite.

Preferably, the mass ratio of the two molecular sieves in SSZ-39, SSZ-16, Zeolite Beta, SAPO-34, SSZ-13, Zeolite Y, ZSM-5, and Zeolite Mordenite is always (0.1-1):(0.1-1).

Preferably, the surfactant is cetyltrimethylammonium chloride, cetyltrimethylammonium bromide, Pluronic P123, Pluronic F127, Pluronic F108, Brij 56, Brij 78, Triton X-100, Triton X-114, Tween 20, Tween 40, Tween 60, Tween 80, Span 40, or Span 80.

Preferably, in step (2), the acidic precursor solution and the alkaline precursor solution are mixed by way of adding the acidic precursor solution dropwise into the alkaline precursor solution, or adding the alkaline precursor solution dropwise into the acidic precursor solution, or simultaneously adding the acidic precursor solution and the alkaline precursor solution into the same vessel. The acidic precursor solution and the alkaline precursor solution have mass concentrations of 5%-20%. The atomic mole fraction of the one or two of manganese, iron, cobalt, nickel, copper, or cerium metal in the metal salt is 1. The atomic mole fractions of aluminum, titanium, zirconium and silicon in the aluminum source, the titanium source, the zirconium source and the alkaline silicon source are 0-0.5, 0-0.5, 0-0.5 and 1-2, respectively. The acidic precursor solution further comprises a metal salt of one or two or three of a magnesium source, a calcium source, an indium source, a tin source, a lanthanum source, a tungsten source, and/or a molybdenum source, and the total atomic mole fraction of magnesium, calcium, indium, tin, lanthanum, tungsten, and molybdenum in the one or two or three of the magnesium source, calcium source, indium source, tin source, lanthanum source, tungsten source and molybdenum source is 0.1-0.5.

Preferably, in the metal salt of the two of manganese, iron, cobalt, nickel, copper, and cerium in step (2), the molar ratio of the two metal atoms are always (0.05-0.95):(0.05-0.95). In the metal salt of the two or three of magnesium, calcium, indium, tin, lanthanum, tungsten, and/or molybdenum, the molar ratios of the two metal atoms or the three metal atoms are always (0.05-0.45):(0.05-0.45) and (0.05-0.45):(0.05-0.45):(0.05-0.45), respectively.

Preferably, the aluminum source is aluminum sol, aluminum chloride, aluminum sulfate, or aluminum nitrate; the titanium source is titanium sol, titanium sulfate, or titanium oxysulfate; the zirconium source is zirconium sol, zirconium oxychloride, zirconium sulfate, zirconium nitrate, or zirconyl nitrate. The alkaline silicon source is alkaline silica sol, or a soluble silicate. The magnesium source is a soluble acetate, nitrate, sulfate, or hydrochloride. The calcium source is a soluble acetate, nitrate, sulfate, or hydrochloride. The indium source is a soluble acetate, nitrate, sulfate, or hydrochloride. The tin source is a soluble acetate, nitrate, sulfate, or hydrochloride. The lanthanum source is a soluble acetate, nitrate, sulfate, or hydrochloride. The tungsten source is sodium tungstate, or ammonium tungstate; and the molybdenum source is sodium molybdate, or ammonium molybdate.

Preferably, in step (3), the alkaline compound is sodium hydroxide, potassium hydroxide, ammonium hydroxide, urea, ammonium carbonate, ammonium bicarbonate, ammonium sulfate, ammonium bisulfate, ammonium oxalate, sodium carbonate, sodium bicarbonate, potassium carbonate, or potassium bicarbonate. The alkaline compound solution has a mass concentration of 5%-30%. The pH value of the mixed solution or slurry obtained in step (2) after having been adjusted with the alkaline compound solution is 7.5-9. The pore-forming agent is activated carbons, carbon blacks, nano carbon materials, or graphite. The aging reaction is carried out at 40° C.-95° C. and lasts for 0.5-12 h. Te filtrate has an electrical conductivity lower than 500 μs/cm, and the ratio of the total mass of multiple oxides calculated on the basis of the masses of oxides in the multi-oxide precursor to the mass of the molecular sieves in step (1) is 0.5-1.5:1.

Preferably, the multi-oxide precursor in step (3) comprises several oxide compositions of MnO, FeO and/or $Fe_2O_3$, CoO, NiO, CuO, $CeO_2$, $Al_2O_3$, $TiO_2$, $ZrO_2$, $SiO_2$, MgO, CaO, $In_2O_3$, $SnO_2$, $La_2O_3$, $WO_3$, and/or $MoO_3$.

Preferably, the mass of the pore-forming agent added is 5%-50% of the total mass of the multiple oxides.

Preferably, the mass of the pore-forming agent added is 10%-30% of the total mass of the multiple oxides.

Preferably, the pH value is 8-8.5; the aging reaction is carried out at 50° C.-80° C. and lasts for 1-6 h.

Preferably, in step (4), the stirring and mixing lasts for 0.5-3 h. The vacuum dewatering is carried out at 75° C.-85° C. at a degree of vacuum of −0.85-0.95 Mpa. The drying is carried out at 100° C.-150° C. and lasts for 12-24 h, and the high-temperature calcining is carried out at 350° C.-450° C. and lasts for 2-6 h.

Preferably, in step (5), the sieving is performed to ensure the particle size of the pulverized composite denitration catalyst active component obtained in step (4) to be smaller than 45 μm. The titanium-based support is titanium dioxide powder, titanium-silicon powder, titanium-tungsten powder, or titanium-tungsten-silicon powder. The inorganic binder is attapulgite clay, bentonite, montmorillonite, or kaolin. The organic binder is aminocarboxymethyl cellulose, hydroxypropyl methyl cellulose, or polyethylene oxide. The structure enhancer is glass fiber, carbon fiber, or ceramic fiber. The molding pore-forming agent is *sesbania* powder, wood pulp, activated carbons, or carbon blacks. The lubricant is glycerin, lactic acid, or stearic acid. The weight ratio of the composite denitration catalyst active component to the titanium-based support to the inorganic binder to the structure enhancer is (10-40):(40-70):(10-30):(3-8). Based on the total weight of the composite denitration catalyst active component, the titanium-based support, the inorganic binder and the structure enhancer, the weight percents of the organic binder, the molding pore-forming agent, the lubricant and water are 1.2%-3.8%, 0.4%-1.0%, 0.8%-2.5% and 51.5%-66.7% of the total weight, respectively. The staling refers to allowing the paste to rest in a sealed environment for 15-36 h. The catalyst is integrally extruded and formed into one of a granular type, a clover shape, a hollow cylindrical shape, an integrally extruded honeycomb shape and an integral extruded plate shape. The drying is carried out at 35° C.-80° C. under a humidity of 80%-35% and lasts for 20-80 h, and the calcining is carried out at 500° C.-650° C. and lasts for 2-6 h.

Embodiments of the present invention may have the following beneficial effects:

According to embodiments of the present invention, integral extrusion type denitration catalysts may be prepared from an ion-exchanged molecular sieve-multiple oxide composite serving as an active component, and aided by an anti-sulfur titanium-based support and an inorganic binder. The prepared catalysts are low-cost and environment-friendly vanadium-free denitration catalysts. An integral extrusion type denitration catalyst prepared in accordance with embodiments of the present invention may have a NOx conversion rate more than 80% at the temperature ranging from 250° C. to 420° C. The synergistic effects among the ion-exchanged molecular sieves, the multiple oxides, and the titanium-based support enable the catalysts to exhibit good water and sulfur poisoning resistance.

DETAILED DESCRIPTION OF THE INVENTION

The principle and features of the present invention are described below with reference to the accompanying drawing. The illustrated embodiments are only for explaining the present invention, but not intended to limit the scope of the present invention.

Embodiment 1

Step (1) is implemented in the following way: adding 1.6 g of copper acetate ($Cu(CH_3COO)_2.H_2O$) into 100.0 g of deionized water and stirring until the copper acetate is completely dissolved; adding 20.0 g of ZSM-5 molecular sieves (the molar ratio of $SiO_2$ to $Al_2O_3$ is 25) and stirring for 2 h in an 80° C. constant-temperature water bath; then, adding 2.0 g of F127 and stirring until F127 is completely dissolved; and mixing for 20 min by using a JRJ300-S digital shear emulsification mixer. Herein, the mass of Cu in the copper solution is 2.5% of the mass of the molecular sieves.

Step (2) is implemented in the following way: adding 13.1 g of ferrous sulfate ($FeSO_4.7H_2O$), 3.0 g of titanium oxysulfate ($TiOSO_4$) and 1.5 g of zirconium oxychloride ($ZrOCl_2.8H_2O$) into 335.0 g of deionized water (the mass fraction of the solutes is 5%) and then stirring until they are completely dissolved to obtain a solution, marked as Solution A; adding 15.1 g of sodium type silica sol ($Na_2O<0.4\%$, 30% $SiO_2$) into 7.6 g of deionized water (the mass fraction of the solute is 20%), and then stirring to obtain a uniform solution, marked as Solution B; and adding Solution B dropwise to Solution A while stirring, adjusting the pH value of the system to 8-8.5 with 25%-28% ammonium hydroxide, and then adding 2.0 g of activated carbons with the mass being 20% of the total mass of oxides, and finally carrying out an aging reaction for 3 h in a 55° C. constant-temperature water bath.

Step (3) is implemented in the following way: filtering the slurry obtained in step (2) and then washing with water until the electrical conductivity of the filtrate is less than 500 μs/cm; adding the obtained filter cake into the molecular sieve slurry obtained in step (1) and stirring and mixing for 1 h at room temperature; then, transferring to a rotary evaporator, setting a water bath temperature at 75° C., and evaporating most of the water out of the material at a degree of vacuum of −0.85 Mpa to −0.95 Mpa until the material is viscous; and drying the obtained product at 120° C. for 18 h and then calcining in a muffle furnace at 400° C. for 4 h, wherein the heating-up rate of the muffle furnace is 1° C./min. Thus, the active component of the molecular sieve-multiple oxide composite denitration catalyst of the present invention is obtained.

In this embodiment, the molar ratio of Fe to Si to Ti to Zr in the multiple oxides is 1:1.6:0.4:0.1, and the mass ratio of the multiple oxides to the molecular sieves is 0.5:1.

Step (4) is implemented in the following way: pulverizing the active component obtained in step (3) with an RT-04SF-type high-speed pulverizer and sieving so that the particle size becomes smaller than 45 μm (325 meshes); mixing 20.0 g of the pulverized active component, 60.0 g of titanium dioxide, 17.0 g of attapulgite clay, 1.5 g of aminocarboxymethyl cellulose, 3.0 g of glass fibers and 0.4 g of wood pulp uniformly by using the RT-04SF-type high-speed pulverizer; and adding 1.0 g of lactic acid into 56.3 g of deionized water, stirring uniformly, adding into the above mixed material, kneading the material into uniform paste, and staling the paste in a ziplock bag for 15 h in a sealed environment.

Step (5) is implemented in the following way: using a TBL-2-type catalyst extruder to extrude the material staled in step (4) into strips with a diameter of 2 mm, and then drying and calcining to obtain a molecular sieve-multiple oxide composite integral extrusion type denitration catalyst. Samples are dried in a BPS100CL constant temperature and humidity chamber at 30° C. under a humidity of 80% for 4 h, at 40° C. under a humidity of 70% for 4 h, at 50° C. under a humidity of 60% for 4 h, at 60° C. under a humidity of 50% for 1 h, at 70° C. under a humidity of 40% for 1 h, and at 80° C. under a humidity of 35% for 1 h, respectively, and then dried in a 100° C. oven for 8 h. Finally, the samples are calcined in the muffle furnace at 500° C. for 6 h, wherein the heating up rate of the muffle furnace is 1° C./min. The calcined samples are cut into 3-5 mm columnar particles for activity testing.

The activity of the stripe-shaped catalyst is tested under the following conditions: 500 ppm nitrogen monoxide, 500 ppm ammonia gas, 500 ppm sulfur dioxide, 10% steam, 10% oxygen, the reaction equilibrium gas being nitrogen, the catalyst loading being 20 ml, and the reaction space velocity being 15000 h$^{-1}$. Table 1 shows the NOx conversion rates of the stripe-shaped catalysts at the following eight temperatures: 250° C., 270° C., 300° C., 320° C., 350° C., 370° C., 400° C. and 420° C.

Comparison Embodiment 1

Comparison Embodiment 1 differs from Embodiment 1 in that no F127 is added in step (1) and no activated carbons are added in step (2). The NOx conversion rates of the stripe-shaped catalysts are listed in Table 1.

Comparison Embodiment 2

Comparison Embodiment 2 differs from Embodiment 1 in that no F127 is added in step (1). The NOx conversion rates of the stripe-shaped catalysts are listed in Table 1.

Embodiment 2

This embodiment differs from Embodiment 1 in the molecular sieves, ion exchange metal and loading used in step (1) and in that the silicon source in step (2) is sodium silicate ($Na_2SiO_3.9H_2O$). Details are specified as follows:

Step (1) is implemented in the following way: adding 3.3 g of ferrous sulfate ($FeSO_4.7H_2O$) into 100.0 g of deionized water and stirring until the ferrous sulfate is completely dissolved; adding 20.0 g of Zeolite Mordenite molecular sieves (the molar ratio of $SiO_2$ to $Al_2O_3$ is 15) and stirring for 2 h in an 80° C. constant-temperature water bath; and adding 2.0 g of F127 and mixing for 20 min by using a JRJ300-S digital shear emulsification mixer. Herein, the mass of Fe in the ferric solution is 3.2% of the mass of the molecular sieves.

Step (2) is implemented in the following way: adding 13.1 g of ferrous sulfate ($FeSO_4.7H_2O$), 3.0 g of titanium oxysulfate ($TiOSO_4$) and 1.5 g of zirconium oxychloride ($ZrOCl_2.8H_2O$) into 335.0 g of deionized water (the mass fraction of the solutes is 5%) and then stirring until they are completely dissolved to obtain a solution, marked as Solution A; adding 21.4 g of sodium silicate ($Na_2SiO_3.9H_2O$) into 85.6 g of deionized water (the mass fraction of the solute is 20%), and stirring until $Na_2SiO_3.9H_2O$ is completely dissolved to obtain a solution, marked as Solution B; and adding Solution B dropwise into Solution A while stirring, adjusting the pH value of the system to 8-8.5 with 25-28% ammonium hydroxide, and then adding 2.0 g of activated carbons with the mass being 20% of the total mass of oxides, and finally carrying out an aging reaction for 3 h in a 55° C. constant-temperature water bath.

The NOx conversion rates of the stripe-shaped catalysts are listed in Table 1.

Embodiment 3

Step (1) is implemented in the following way: adding 1.4 g of copper sulfate ($CuSO_4.5H_2O$) and 1.6 g of ferrous sulfate ($FeSO_4.7H_2O$) into 140.0 g of deionized water and stirring until they are completely dissolved; adding 20.0 g of SSZ-13 molecular sieves (the molar ratio of $SiO_2$ to $Al_2O_3$ is 22) and stirring for 2.5 h in a 75° C. constant-temperature water bath; and adding 3.5 g of cetyltrimethylammonium bromide, stirring until cetyltrimethylammonium bromide is completely dissolved, and mixing for 10 min by using a JRJ300-S digital shear emulsification mixer. Herein, the mass of Cu and Fe in the mixed solution is 3.3% of the mass of the molecular sieves and the molar ratio of Cu to Fe is 1:1.

Step (2) is implemented in the following way: adding 3.2 g of manganese sulfate ($MnSO_4.H_2O$), 18.0 g of cerium sulfate ($Ce(SO_4)_2.4H_2O$), 4.6 g of titanium sulfate ($Ti(SO_4)_2$), 8.8 g of zirconium sulfate ($ZrOSO_4.4H_2O$), and 8.5 g of aluminum sulfate ($Al_2(SO_4)_3.18H_2O$) into 172.4 g of deionized water (the mass fraction of the solutes is 20%) and stirring until they are completely dissolved to obtain a solution, marked as Solution A; adding 24.2 g of liquid sodium silicate ($Na_2O$: 9.0%, $SiO_2$: 28.4%, modulus: 3.1-3.4) into 156.8 g of deionized water (the mass fraction of the solute is 5%), and then stirring to obtain a uniform solution, marked as Solution B; and adding Solution A dropwise to Solution B while stirring, adjusting the pH value of the system to 8-8.5 with a 30% NaOH solution, and then adding 2.2 g of carbon blacks with the mass being 10% of the total mass of oxides, and finally carrying out an aging reaction for 6 h in a 50° C. constant-temperature water bath.

Step (3) is implemented in the following way: filtering the slurry obtained in step (2) and washing with water until the electrical conductivity of the filtrate is less than 500 μs/cm; adding the obtained filter cake into the molecular sieve slurry obtained in step (1) and stirring and mixing for 0.5 h at room temperature; then, transferring to a rotary evaporator to evaporate most of the water out of the material at a water bath temperature of 80° C. at a degree of vacuum of −0.85 Mpa to −0.95 Mpa until the material is viscous; and drying the obtained product at 100° C. for 24 h and then calcining in a muffle furnace at 450° C. for 2 h, wherein the heating-up rate of the muffle furnace is 1° C./min. Thus, the molecular sieve-multiple oxide composite denitration catalyst active component of the present invention is obtained.

In this embodiment, the molar ratio of Mn to Ce to Si to Ti to Zr to Al in the multiple oxides is 03:0.7:1.8:0.3:0.5:0.2, and the mass ratio of the multiple oxides to the molecular sieves is 1.1:1.

Step (4) is implemented in the following way: pulverizing the active component obtained in step (3) with an RT-04SF-type high-speed pulverizer and sieving so that the particle size becomes smaller than 45 μm (325 meshes); mixing 40.0 g of the pulverized active component, 36.0 g of Titanium-tungsten powder, 20.0 g of bentonite, 1.2 g of hydroxypropyl methyl cellulose, 4.0 g of ceramic fibers and 0.5 g of *sesbania* powder uniformly by using the RT-04SF-type high-speed pulverizer; and adding 0.8 g of glycerinum to 61.3 g of deionized water and stirring uniformly, adding this into the above mixed material, kneading into uniform paste, and staling the paste in a ziplock bag for 20 h in a sealed environment.

Step (5) is implemented in the following way: using a TBL-2-type catalyst extruder to extrude the material staled in step (4) into strips with a diameter of 2 mm, and then drying and calcining to obtain a molecular sieve-multiple oxide composite integral extrusion type denitration catalyst. Samples are dried in a BPS100CL constant temperature and humidity chamber at 30° C. under a humidity of 80% for 3 h, at 40° C. under a humidity of 70% for 3 h, at 50° C. under a humidity of 60% for 3 h, at 60° C. under a humidity of 50% for 1 h, at 70° C. under a humidity of 40% for 1 h, and at 80° C. under a humidity of 35% for 1 h, respectively, and then dried in a 100° C. oven for 8 h. Finally, the samples are calcined in the muffle furnace at 550° C. for 4 h, wherein the heating up rate of the muffle furnace is 1° C./min. The calcined samples are cut into 3-5 mm columnar particles for activity testing.

The activity of the stripe-shaped catalyst is tested under the following conditions: 500 ppm nitrogen monoxide, 500 ppm ammonia gas, 500 ppm sulfur dioxide, 10% steam, 10% oxygen, the reaction equilibrium gas being nitrogen, the catalyst loading being 20 ml, and the reaction space velocity being 15000 $h^{-1}$. Table 1 shows the NOx conversion rates of the stripe-shaped catalysts at the following eight temperatures: 250° C., 270° C., 300° C., 320° C., 350° C., 370° C., 400° C. and 420° C.

Regarding Embodiment 3, it should be noted that the molar ratio of Cu to Fe in step (1) can be arbitrarily adjusted within the range of (0.05-1):(0.05-1). When the molar ratio is 1:0.05, the obtained catalyst has better denitration activity in a temperature section of 250° C.-350° C.; when the molar ratio is 0.05:1, the obtained catalyst has better denitration activity in a temperature section of 350° C.-420° C.; and it is well known to those skilled in the art that the introduction of Fe can expand the temperature window of the molecular sieve-based denitration catalyst so that the molar ratio of Cu to Fe can be adjusted according to the practical application of the final integral extrusion type catalyst.

In this embodiment, the molar ratio of Mn to Ce to Si to Ti to Zr to Al in the multi-oxide composition is 0.3:0.7:1.8: 0.3:0.5:0.2 and the molar ratio of Mn to Ce can be arbitrarily adjusted within the range of (0.05-0.95):(0.05-0.95). Mn is mainly used to improve the denitration activity of the catalyst in a low temperature section; addition of Ce can improve the denitration activity of the catalyst and increase the sulfur poisoning resistance of the catalyst; Si, Ti, Zr and Al mainly function as a support in the catalyst and are used to adjust the surface acidity of the molecular sieve-multiple oxide composite catalyst; the preferred range of the atomic mole fraction of silicon in the silicon source is the total mole fraction of Mn, Ce, Ti, Zr and Al±0.2, the atomic molar ratio of Ti to Zr to Al can be arbitrarily adjusted in the range of (0.05-0.5):(0.05-0.5):(0.05-0.5); the addition of Ti, Zr and Al is beneficial to the denitration performance of the integral extrusion type catalyst and the object of the present invention can be achieved within this molar ratio range.

Embodiment 4

Step (1) is implemented in the following way: adding 3.1 g of ferric nitrate ($Fe(NO_3)_3 \cdot 9H_2O$) and 0.8 g of cerium acetate ($Ce(NO_3)_3 \cdot 6H_2O$) into 200.0 g of deionized water and stirring until they are completely dissolved; adding 20.0 g of SSZ-16 molecular sieves (the molar ratio of $SiO_2$ to $Al_2O_3$ is 10) and stirring for 3.5 h in a 70° C. constant-temperature water bath; and adding 10.0 g of Tween60 and mixing for 20 min by using a JRJ300-S digital shear emulsification mixer. Herein, the mass of Fe to Ce in the mixed solution is 4.0% of the mass of the molecular sieves and the molar ratio of Fe to Ce is 1:0.3.

Step (2) is implemented in the following way: adding 11.4 g of aluminum sol ($Al_2O_3$: 20%) into 166.1 g of deionized water, stirring uniformly, and then adding 17.8 g of Manganese chloride ($MnCl_2 \cdot 4H_2O$), 4.6 g of Magnesium chloride ($MgCl_2 \cdot 6H_2O$) and 1.5 g of calcium chloride ($CaCl_2$) and stirring until they are completely dissolved to obtain a solution (the mass fraction of the solutes is 13%), marked as Solution A; adding 12.5 g of solid sodium silicate ($SiO_2$: 77.8%, $Na_2O$: 22.2%, modulus: 3.4-3.6) into 166.1 g of deionized water (the mass fraction of the solute is 7%), and stirring until the solid sodium silicate is completely dissolved to obtain a solution, marked as Solution B; and adding Solution A dropwise into Solution B while stirring, adjusting the pH value of the system to 8-8.5 with a 10% $Na_2CO_3$ solution, and then adding 2.4 g of carbon nanotubes with the mass being 12% of the total mass of the oxides, and finally carrying out an aging reaction for 4 h in a 70° C. constant-temperature water bath.

Step (3) is implemented in the following way: filtering the slurry obtained in step (2) and washing with water until the electrical conductivity of the filtrate is less than 500 μs/cm; adding the obtained filter cake into the molecular sieve slurry obtained in step (1) and stirring and mixing for 3 h at room temperature; then, transferring to a rotary evaporator to evaporate most of water out of the material at a water bath temperature of 85° C. at a degree of vacuum of −0.85 Mpa to −0.95 Mpa until the material is viscous; and drying the obtained product at 150° C. for 12 h and then calcining in a muffle furnace at 350° C. for 6 h, wherein the heating-up rate of the muffle furnace is 1° C./min. Thus, the molecular sieve-multiple oxide composite denitration catalyst active component of the present invention is obtained.

In this embodiment, the molar ratio of Mn to Si to Al to Mg to Ca in the multiple oxides is 1:1.8:0.5:0.25:0.15, and the mass ratio of the multiple oxides to the molecular sieves is 1:1.

Step (4) is implemented in the following way: pulverizing the active component obtained in step (3) with an RT-04SF-type high-speed pulverizer and sieving so that the particle size becomes smaller than 45 μm (325 meshes); mixing 10.0 g of the pulverized active component, 70.0 g of titanium-silicon powder, 15.0 g of montmorillonite, 0.8 g of aminocarboxymethyl cellulose, 1.3 g of polyethylene oxide, 5.0 g of glass fibers and 0.7 g of carbon blacks uniformly by using the RT-04SF-type high-speed pulverizer; and adding 1.0 g of glycerinum to 58.7 g of deionized water, stirring uniformly, adding into the above mixed material, kneading into uniform paste, and staling the paste in a ziplock bag for 17 h in a sealed environment.

Step (5) is implemented in the following way: using a TBL-2-type catalyst extruder to extrude the material staled in step (4) into strips with a diameter of 2 mm, and then drying and calcining to obtain a molecular sieve-multiple oxide composite integral extrusion type denitration catalyst. Samples are dried in a BPS100CL constant temperature and humidity chamber at 30° C. under a humidity of 80% for 5 h, at 40° C. under a humidity of 70% for 3 h, at 50° C. under a humidity of 60% for 3 h, at 60° C. under a humidity of 50% for 1 h, at 70° C. under a humidity of 40% for 1 h, and at 80° C. under a humidity of 35% for 1 h, respectively, and then dried in a 100° C. oven for 8 h. Finally, the samples are calcined in the muffle furnace at 550° C. for 4 h, wherein the heating up rate of the muffle furnace is 1° C./min. The calcined samples are cut into 3-5 mm columnar particles for activity testing.

The activity of the stripe-shaped catalyst is tested under the following conditions: 500 ppm nitrogen monoxide, 500 ppm ammonia gas, 500 ppm sulfur dioxide, 10% steam, 10% oxygen, the reaction equilibrium gas being nitrogen, the catalyst loading being 20 ml, and the reaction space velocity being 15000 $h^{-1}$. Table 1 shows the NOx conversion rates of the stripe-shaped catalysts at the following eight temperatures: 250° C., 270° C., 300° C., 320° C., 350° C., 370° C., 400° C. and 420° C.

Regarding Embodiment 4, it should be noted that the atomic molar ratio of Mn to Si to Al to Mg to Ca in the multiple oxides is 1:1.8:0.5:0.25:0.15. In this embodiment, alkaline-earth metal salts of Mg, Ca and the like are further introduced in the acidic precursor solution in step (2) as multi-oxide coagents, the atomic molar ratio of the two additives can be arbitrarily adjusted within the range of (0.05-0.45):(0.05-0.45), and the total atomic mole fraction is 0.1-0.5. The addition of these additives is mainly used to improve the sulfur poisoning resistance of the final integral extrusion type denitration catalyst. The addition of the coagents enriches the technical solutions of the present invention, making it easier for the present invention to achieve the technical objects of the present invention.

Embodiment 5

Step (1) is implemented in the following way: adding 1.6 g of cerium acetate ($Ce(CH_3COO)_3$) into 180.0 g of deionized water and stirring until the Cerium acetate is completely dissolved; adding 20.0 g of SAPO-34 molecular sieves ($P_2O_5$: 47.9%, $Al_2O_3$: 38.0%, and $SiO_2$: 14.1%) and stirring for 3 h in a 75° C. constant-temperature water bath; and adding 4.5 g of P123 and mixing for 10 min by using a JRJ300-S digital shear emulsification mixer. Herein, the mass of Ce in the mixed solution is 3.5% of the mass of the molecular sieves.

Step (2) is implemented in the following way: adding 12.4 g of zircon sol ($ZrO_2$: 15%) into 280.2 g of deionized water, adding 5.5 g of Nickel nitrate ($Ni(NO_3)_2.6H_2O$), 5.5 g of cobalt nitrate ($Co(NO_3)_2.6H_2O$), 2.2 g of indium chloride ($InCl_3.4H_2O$), 2.6 g of tin tetrachloride ($SnCl_4.5H_2O$) and 0.9 g of lanthanum chloride ($LaCl_3$), and stirring until they are completely dissolved to obtain a solution (the mass fraction of the solutes is 6%), marked as Solution A; adding 15.2 g of liquid sodium silicate ($Na_2O$: 11.0%, $SiO_2$: 29.7%, modulus: 2.6-2.9) to 62.1 g of deionized water (the mass fraction of the solute is 8%), and stirring to obtain a uniform solution, marked as Solution B; and simultaneously adding Solution A and Solution B dropwise into the same vessel while stirring, adjusting the pH value of the system to 8-8.5 with a 5% NaOH solution, adding 2.2 g of graphite with the mass being 18% of the total mass of the oxides, and carrying out an aging reaction for 5 h in a 60° C. constant-temperature water bath.

Step (3) is implemented in the following way: filtering the slurry obtained in step (2) and washing with water until the electrical conductivity of the filtrate is less than 500 μs/cm; adding the obtained filter cake into the molecular sieve slurry obtained in step (1) and stirring and mixing for 2 h at room temperature; then, transferring this to a rotary evaporator to evaporate most of water out of the material at a water bath temperature of 80° C. at a degree of vacuum of −0.85 Mpa to −0.95 Mpa until the material is viscous; and drying the obtained product at 120° C. for 20 h and then calcining in a muffle furnace at 400° C. for 4 h, wherein the heating-up rate of the muffle furnace is 1° C./min. Thus, the active component of the molecular sieve-multiple oxide composite denitration catalyst of the present invention is obtained.

In this embodiment, the molar ratio of Ni to Co to Si to Zr to In to Sn to La in the multiple oxides is 0.5:0.5:2:0.4:0.2:0.2:0.1, and the mass ratio of the multiple oxides to the molecular sieves is 0.6:1.

Step (4) is implemented in the following way: pulverizing the active component in step (3) with an RT-04SF-type high-speed pulverizer and sieving so that the particle size becomes smaller than 45 μm (325 meshes); mixing 30.0 g of the pulverized active component, 56.0 g of titanium-tungsten-silicon powder, 10.0 g of kaolin, 1.5 g of aminocarboxymethyl cellulose, 0.9 g of polyethylene oxide, 4.0 g of ceramic fibers and 0.6 g of activated carbons uniformly by using the RT-04SF-type high-speed pulverizer; and adding 1.2 g of lactic acid into 60.0 g of deionized water, stirring uniformly, adding this into the above mixed material, kneading into uniform paste, and staling the paste in a ziplock bag for 18 h in a sealed environment.

Step (5) is implemented in the following way: using a TBL-2-type catalyst extruder to extrude the material staled in step (4) into strips with a diameter of 2 mm, and then drying and calcining to obtain a molecular sieve-multiple oxide composite integral extrusion type denitration catalyst. Samples are dried in a BPS100CL constant temperature and humidity chamber at 30° C. under a humidity of 80% for 6 h, at 40° C. under a humidity of 70% for 6 h, at 50° C. under a humidity of 60% for 3 h, at 60° C. under a humidity of 50% for 1 h, at 70° C. under a humidity of 40% for 1 h, and at 80° C. under a humidity of 35% for 1 h, respectively, and then dried in a 100° C. oven for 8 h. Finally, the samples are calcined in the muffle furnace at 650° C. for 2 h, wherein the heating up rate of the muffle furnace is 1° C./min. The calcined samples are cut into 3-5 mm columnar particles for activity testing.

The activity of the stripe-shaped catalyst is tested under the following conditions: 500 ppm nitrogen monoxide, 500 ppm ammonia gas, 500 ppm sulfur dioxide, 10% steam, 10% oxygen, the reaction equilibrium gas being nitrogen, the catalyst loading being 20 ml, and the reaction space velocity being 15000 $h^{-1}$. Table 1 shows the NOx conversion rates of the stripe-shaped catalysts at the following eight temperatures: 250° C., 270° C., 300° C., 320° C., 350° C., 370° C., 400° C. and 420° C.

Regarding Embodiment 5, it should be noted that the atomic molar ratio of Ni to Co to Si to Zr to In to Sn to La in the multiple oxides is 0.5:0.5:2:0.4:0.2:0.2:0.1. In this embodiment, metal salts of In, Sn, La and the like are further introduced in the acidic precursor solution in step (2) as multi-oxide coagents, the atomic molar ratio of the three additives can be arbitrarily adjusted within the range of (0.05-0.45):(0.05-0.45):(0.05-0.45), and the total atomic mole fraction is 0.15-0.5. The addition of these additives is mainly used to improve the sulfur poisoning resistance of the final integral extrusion type denitration catalyst. The addition of these additives enriches the technical solutions of the present invention, making it easier for the present invention to achieve the technical objects of the present invention.

Embodiment 6

This embodiment differs from Embodiment 5 in the molecular sieves, ion exchange metal and loading used in step (4) and in that the silicon source and the zirconium source used in step (2) are solid sodium silicate and zirconyl nitrate, respectively. Details are specified as follows:

Step (1) is implemented in the following way: adding 2.6 g of manganese acetate ($Mn(CH_3COO)_2.4H_2O$) into 180.0 g of deionized water and stirring until the Manganese acetate is completely dissolved; adding 18.2 g of ZSM-5 molecular sieves (the molar ratio of $SiO_2$ to $Al_2O_3$ is 30) and 1.8 g of SAPO-34 molecular sieves ($P_2O_5$: 48.7%, $Al_2O_3$: 42.6%, and $SiO_2$: 8.7%) and stirring for 3 h in a 75° C. constant-temperature water bath; and adding 4.5 g of P123 and mixing for 10 min by using a JRJ300-S digital shear emulsification mixer. Herein, the mass of Mn in the manganese solution is 2.8% of the mass of the molecular sieves.

Step (2) is implemented in the following way: adding 4.0 g of zirconyl nitrate ($ZrO(NO_3)_2.2H_2O$) to 324.3 g of deionized water, adding 5.5 g of nickel nitrate ($Ni(NO_3)_2.6H_2O$), 5.5 g of cobalt nitrate ($Co(NO_3)_2.6H_2O$), 2.2 g of indium chloride ($InCl_3.4H_2O$), 2.6 g of tin tetrachloride ($SnCl_4.5H_2O$) and 0.9 g of lanthanum chloride ($LaCl_3$), and stirring until they are completely dissolved to obtain a solution (the mass fraction of the solutes is 6%), marked as Solution A; adding 6.5 g of solid sodium silicate ($Na_2O$: 29.9%, $SiO_2$: 70.1%, modulus: 2.2-2.5) into 74.8 g of deionized water (the mass fraction of the solute is 8%), and then stirring to obtain a uniform solution, marked as Solution B; and simultaneously Solution A and Solution B dropwise into the same vessel while stirring, adjusting the pH value of the system to 8-8.5 with a 5% NaOH solution, adding 2.2 g of graphite with the mass being 18% of the total mass of oxides, and carrying out an aging reaction for 5 h in a 60° C. constant-temperature water bath.

The NOx conversion rates of the stripe-shaped catalysts are listed in Table 1.

Regarding Embodiment 6, it should be noted that the mass ratio of the two molecular sieves (ZSM-5 and SAPO-34) is 1:0.1, and may be arbitrarily adjusted in the range of (0.1-1):(0.1-1), all of which can achieve the technical object of the present invention. It is well known to those skilled in the art that SAPO-34 has better hydrothermal stability and therefore the mass ratio of the two molecular sieves can be adjusted according to the actual application of the final integral extrusion type catalyst.

Embodiment 7

Step (1) is implemented in the following way: adding 31.9 g of manganese nitrate ($Mn(NO_3)_2$, 50% solution) to 1440.0 g of deionized water and stirring and mixing uniformly; adding 240.0 g of SSZ-39 molecular sieves (the molar ratio of $SiO_2$ to $Al_2O_3$ is 20) and stirring for 5 h in a 55° C. constant-temperature water bath; and adding 72.0 g of Tween20 and mixing for 30 min by using a JRJ300-S digital shear emulsification mixer. Herein, the mass of Mn in the Manganese solution is 2.0% of the mass of the molecular sieves.

Step (2) is implemented in the following way: adding 411.9 g of cerium sulfate ($Ce(SO_4)_2.4H_2O$), 67.9 g of aluminum sulfate ($Al_2(SO_4)_3.18H_2O$) and 140.8 g of ammonium metatungstate ($WO_3 \geq 84\%$) into 5585.4 g of deionized water (the mass fraction of the solutes is 10%) and stirring until they are completely dissolved to obtain a solution, marked as Solution A; adding 203.9 g of ammonium sol ($SiO_2$: 30%) into 407.8 g of deionized water (the mass fraction of the solute is 10%), and then stirring so that ammonium sol is completely dissolved to obtain a solution, marked as Solution B; and simultaneously adding Solution A and Solution B dropwise into the same vessel while stirring, adjusting the pH value of the system to 8-8.5 with a 20% $NH_4HCO_3$ solution, adding 108.0 g of activated carbons with the mass being 30% of the total mass of oxides, and carrying out an aging reaction for 1 h in an 80° C. constant-temperature water bath.

Step (3) is implemented in the following way: filtering the slurry obtained in step (2) and washing with water until the electrical conductivity of the filtrate is less than 500 μs/cm; adding the obtained filter cake to the molecular sieve slurry obtained in step (1) and stirring and mixing for 1 h at room temperature; then, transferring to a rotary evaporator to evaporate most of water out of the material at a water bath temperature of 85° C. at a degree of vacuum of −0.85 Mpa to −0.95 Mpa until the material is viscous; and drying the obtained product at 150° C. for 15 h and then calcining in a muffle furnace at 350° C. for 6 h, wherein the heating-up rate of the muffle furnace is 1° C./min. Thus, the molecular sieve-multiple oxide composite denitration catalyst active component of the present invention is obtained.

In this embodiment, the molar ratio of Ce to Al to Si to W in the multiple oxides is 1:0.1:1:0.5, and the mass ratio of the multiple oxides to the molecular sieves is 1.5:1.

Step (4) is implemented in the following way: pulverizing the active component obtained in step (3) with an RT-04SF-type high-speed pulverizer and sieving so that the particle size becomes smaller than 45 μm (325 meshes); mixing 480.0 g of the pulverized active component, 1272.0 g of titanium-silicon powder, 480.0 g of montmorillonite, 26.4 g of aminocarboxymethyl cellulose, 57.6 g of polyethylene oxide, 19.2 g of carbon blacks and 4.8 g of stearic acid for 30 min by using a QLJ-10L-type powerful mixer; and stirring 48.0 g of lactic acid and 1600.0 g of deionized water uniformly and adding this into the material, mixing and stirring for 10 min, adding 12.0 g of carbon fibers, 156.0 g of ceramic fibers and 80.0 g of deionized water, mixing until the fibers are completely broken and the material becomes uniform paste (the paste is finally mixed to have a moisture content of 34%-35%), and then staling the paste in a ziplock bag for 24 h in a sealed environment.

Step (5) is implemented in the following way: uniformly pressing 200 g of material staled in step (4) on a stainless steel mesh plate with a material thickness of 1 mm, and then cutting into a shape with a length*width of 10 cm*3 cm, and finally drying and calcining to obtain the molecular sieve-multiple oxide composite integral extrusion-type denitration catalyst. Samples are dried in a BPS100CL constant temperature and humidity chamber at 30° C. under a humidity of 80% for 18 h, at 40° C. under a humidity of 70% for 18 h, at 50° C. under a humidity of 60% for 12 h, at 60° C. under a humidity of 50% for 12 h, at 70° C. under a humidity of 40% for 6 h, and at 80° C. under a humidity of 35% for 6 h, respectively, and then dried in a 100° C. oven for 8 h. Finally, the samples are calcined in the muffle furnace at 600° C. for 3 h, wherein the heating up rate of the muffle furnace is 1° C./min. Five calcined plate samples are placed equidistantly in a plate-type catalyst test mold for activity testing.

Step (6) is implemented in the following way: using a TLJ-40-type vacuum mixing extruder to extrude the material staled in step (4) into a 3 cm*3 cm (4*4 pores) honeycomb-type catalyst, and then drying and calcining the catalyst to obtain a molecular sieve-multiple oxide composite integral extrusion type denitration catalyst. The drying and calcining conditions in this step are the same as those in step (5). The calcined samples are cut into 10 cm in length for activity testing.

The activity of the plate-type or honeycomb-type catalyst is tested under the following conditions: 500 ppm nitrogen monoxide, 500 ppm ammonia gas, 500 ppm sulfur dioxide, 10% steam, 10% oxygen, the reaction equilibrium gas being nitrogen, the catalyst loading being 90 ml, and the reaction space velocity being 6000 h$^{-1}$. Table 2 shows the NOx conversion rates of the plate-type and honeycomb-type catalysts at the following eight temperatures: 250° C., 270° C., 300° C., 320° C., 350° C., 370° C., 400° C. and 420° C.

Embodiment 8

This embodiment differs from Embodiment 7 in the molecular sieves, ion exchange metal and loading used in step (1) and in that the silicon source used in step (2) is solid sodium potassium silicate. Details are specified as follows:

Step (1) is implemented in the following way: adding 25.2 g of copper nitrate (Cu(NO$_3$)$_2$.3H$_2$O) into 1440.0 g of deionized water and stirring and mixing uniformly; adding 240.0 g of SSZ-39 molecular sieves (the molar ratio of SiO$_2$ to Al$_2$O$_3$ is 15), and stirring for 5 h in a 55° C. constant-temperature water bath; and adding 72.0 g of Tween20 and mixing for 30 min by using a JRJ300-S digital shear emulsification mixer. Herein, the mass of Cu in the copper solution is 2.7% of the mass of the molecular sieves.

Step (2) is implemented in the following way: adding 411.9 g of cerium sulfate (Ce(SO$_4$)$_2$.4H$_2$O), 67.9 g of aluminum sulfate (Al$_2$(SO$_4$)$_3$.18H$_2$O) and 140.8 g of ammonium metatungstate (WO$_3$≥84%) into 5585.4 g of deionized water (the mass fraction of the solutes is 10%), and stirring until they are completely dissolved to obtain a solution, marked as Solution A. Adding 92.7 g of solid sodium potassium silicate (SiO$_2$: 66.0%, Na$_2$O: 11.5%, K$_2$O: 22.5%, modulus: 2.5-2.7) into 834.3 g of deionized water (the mass fraction of the solute is 10%), and stirring until solid sodium potassium silicate is completely dissolved to obtain a solution, marked as Solution B; and simultaneously adding Solution A and Solution B dropwise into the same vessel while stirring, adjusting the pH value of the system to 8-8.5 with a 20% NH$_4$HCO$_3$ solution, and then adding 108.0 g of activated carbons with the mass being 30% of the total mass of oxides; and finally carrying out an aging reaction for 1 h in an 80° C. constant-temperature water bath.

The activity of the plate-type or honeycomb-type catalyst is tested under the following conditions: 500 ppm nitrogen monoxide, 500 ppm ammonia gas, 500 ppm sulfur dioxide, 10% steam, 10% oxygen, the reaction equilibrium gas being nitrogen, the catalyst loading being 90 ml, and the reaction space velocity being 6000 h$^{-1}$. Table 2 shows the NOx conversion rates of the plate-type and honeycomb-type catalysts at the following eight temperatures: 250° C., 270° C., 300° C., 320° C., 350° C., 370° C., 400° C. and 420° C.

Embodiment 9

Step (1) is implemented in the following way: adding 17.5 g of copper acetate (Cu(CH$_3$COO)$_2$.H$_2$O) and 6.9 g of cerium acetate (Ce(CH$_3$COO)$_3$) into 2400.0 g of deionized water and stirring until they are completely dissolved; adding 300.0 g of SSZ-13 molecular sieves (the molar ratio of SiO$_2$ to Al$_2$O$_3$ is 25) and stirring for 4 h in a 60° C. constant-temperature water bath; and adding 72.0 g of Tritonx-100 and mixing for 40 min by using a JRJ300-S digital shear emulsification mixer. Herein, the mass of Cu and Ce in the mixed solution is 2.8% of the mass of the molecular sieves and the molar ratio of Cu to Ce is 1:0.25.

Step (2) is performed in the following way: adding 344.0 g of ferric nitrate (Fe(NO$_3$)$_3$.9H$_2$O), 27.2 g of titanium oxysulfate (TiOSO$_4$), 159.6 g of aluminum nitrate (Al(NO$_3$)$_3$.9H$_2$O) and 28.1 g of sodium tungstate (Na$_2$WO$_4$.2H$_2$O) into 6427.4 g of deionized water (the mass fraction of the solutes is 8%) and stirring until they are completely dissolved to obtain a solution, marked as Solution A; adding 321.6 g of liquid potassium silicate K$_2$O: 18.0%, SiO$_2$: 27.0%, modulus: 2.2-2.5) into 884.4 g of deionized water (the mass fraction of the solute is 12%), and stirring until the potassium silicate is completely dissolved to obtain a solution, marked as Solution B; and adding Solution B dropwise into Solution A while stirring, adjusting the pH value of the system to 8-8.5 with a 15% KOH solution, adding 31.5 g of carbon blacks with the mass being 15% of the total mass of oxides, and carrying out an aging reaction for 2 h in an 80° C. constant-temperature water bath.

Step (3) is implemented in the following way: filtering the slurry obtained in step (2) and washing with water until the electrical conductivity of the filtrate is less than 500 μs/cm; adding the obtained filter cake into the molecular sieve slurry obtained in step (1) and stirring and mixing for 3 h at room temperature. then, transferring to a rotary evaporator to evaporate most of water out of the material at a water bath temperature of 80° C. at a degree of vacuum of −0.85 Mpa to −0.95 Mpa until the material is viscous; and drying the obtained product at 120° C. for 24 h and then calcining in a muffle furnace at 400° C. for 5 h, wherein the heating-up rate of the muffle furnace is 1° C./min. Thus, the molecular sieve-multiple oxide composite denitration catalyst active component of the present invention is obtained.

In this embodiment, the molar ratio of Fe to Si to Ti to Al to W in the multiple oxides is 1:1.7:0.2:0.5:0.1, and the mass ratio of the multiple oxides to the molecular sieves is 0.7:1.

Step (4) is implemented in the following way: pulverizing the active component obtained in step (3) with an RT-04SF-type high-speed pulverizer and sieving so that the particle size becomes smaller than 45 μm (325 meshes); mixing 360.0 g of the pulverized active component, 1128.0 g of titanium-tungsten-silicon powder, 720.0 g of bentonite, 43.2 g of aminocarboxymethyl cellulose, 48.0 g of polyethylene oxide, and 3.6 g of stearic acid for 30 min by using a QLJ-10L-type powerful mixer; and stirring and mixing 56.4 g of lactic acid and 1360.0 g of deionized water uniformly, adding this into a mixer for mixing and stirring for 10 min, adding 24.0 g of uniform wood pulp and 240.0 g of deionized water into the mixer for mixing 10 min, adding 168.0 g of glass fibers, 24.0 g of carbon fibers and 80.0 g of deionized water, mixing until the fibers are completely broken and the material becomes uniform paste (the paste is finally mixed to have a moisture content of 34%-35%), and then staling the paste in a ziplock bag for 30 h in a sealed environment.

Step (5) is implemented in the following way: uniformly pressing 200 g of material staled in step (4) on a stainless steel mesh plate with the material thickness of 1 mm, and then cutting into a shape with length*width of 10 cm*3 cm, and finally drying and calcining to obtain the molecular sieve-multiple oxide composite integral extrusion type denitration catalyst. Samples are dried in a BPS100CL constant temperature and humidity chamber at 30° C. under a humidity of 80% for 18 h, at 40° C. under a humidity of 70% for 18 h, at 50° C. under a humidity of 60% for 12 h, at 60° C. under a humidity of 50% for 12 h, at 70° C. under a humidity of 40% for 6 h, and at 80° C. under a humidity of 35% for 6 h, respectively, and then dried in a 100° C. oven for 8 h. Finally, the samples are calcined in the muffle furnace at 600° C. for 3 h, wherein the heating up rate of the muffle furnace is 1° C./min. Five calcined plate samples are placed equidistantly in a plate-type catalyst test mold for activity testing.

Step (6) is implemented in the following way: using a TLJ-40-type vacuum mixing extruder to extrude the material staled in step (4) into a 3 cm*3 cm (4*4 pores) honeycomb-type catalyst, and then drying and calcining the catalyst to obtain a molecular sieve-multiple oxide composite integral extrusion type denitration catalyst. The drying and calcining conditions in this step are the same as those in step (5). The calcined samples are cut into 10 cm in length for activity testing.

The activity of the plate-type or honeycomb-type catalyst is tested under the following conditions: 500 ppm nitrogen monoxide, 500 ppm ammonia gas, 500 ppm sulfur dioxide, 10% steam, 10% oxygen, the reaction equilibrium gas being nitrogen, the catalyst loading being 90 ml, and the reaction space velocity being 6000 $h^{-1}$. Table 2 shows the NOx conversion rates of the plate-type and honeycomb-type catalysts at the following eight temperatures: 250° C., 270° C., 300° C., 320° C., 350° C., 370° C., 400° C. and 420° C.

Embodiment 10

This embodiment differs from Embodiment 9 in the molecular sieves, ion exchange metal and loading used in step (1) and in that the silicon source used in step (2) is solid potassium silicate. Details are specified as follows:

Step (1) is implemented in the following way: adding 19.8 g of copper acetate ($Cu(CH_3COO)_2.H_2O$) and 5.2 g of cerium acetate ($Ce(CH_3COO)_3$) into 2400.0 g of deionized water and stirring until they are completely dissolved; adding 200.0 g of SSZ-13 molecular sieves (the molar ratio of $SiO_2$ to $Al_2O_3$ is 17) and 100.0 g of Zeolite Beta molecular sieves (the molar ratio of $SiO_2$ to $Al_2O_3$ is 40) and stirring for 4 h in a 60° C. constant-temperature water bath; and adding 72.0 g of Tritonx-100 and mixing for 40 min by using a JRJ300-S digital shear emulsification mixer. Herein, the mass of Cu and Ce in the mixed solution is 2.8% of the mass of the molecular sieves and the molar ratio of Cu to Ce is 1:0.17.

Step (2) is implemented in the following way: 344.0 g of ferric nitrate ($Fe(NO_3)_3.9H_2O$), 27.2 g of titanium oxysulfate ($TiOSO_4$), 159.6 g of aluminum nitrate ($Al(NO_3)_3.9H_2O$) and 28.1 g of sodium tungstate ($Na_2WO_4.2H_2O$) into 6427.4 g of deionized water (the mass fraction of the solutes is 8%) and stirring until they are completely dissolved to obtain a solution, marked as Solution A; adding 128.1 g of solid potassium silicate ($K_2O$: 32.2%, $SiO_2$: 67.8%, modulus: 3.1-3.4) to 939.4 g of deionized water (the mass fraction of the solute is 12%), and then stirring until solid potassium silicate is completely dissolved to obtain a solution, marked as Solution B; and adding Solution B dropwise to Solution A while stirring, adjusting the pH value of the system to 8-8.5 with a 15% KOH solution, adding 31.5 g of carbon blacks with the mass being 15% of the total mass of oxides, and carrying out an aging reaction for 2 h in an 80° C. constant-temperature water bath.

The activity of the plate-type or honeycomb-type catalyst is tested under the following conditions: 500 ppm nitrogen monoxide, 500 ppm ammonia gas, 500 ppm sulfur dioxide, 10% steam, 10% oxygen, the reaction equilibrium gas being nitrogen, the catalyst loading being 90 ml, and the reaction space velocity being 6000 $h^{-1}$. Table 2 shows the NOx conversion rates of the plate-type and honeycomb-type catalysts at the following eight temperatures: 250° C., 270° C., 300° C., 320° C., 350° C., 370° C., 400° C. and 420° C.

Figure 1:
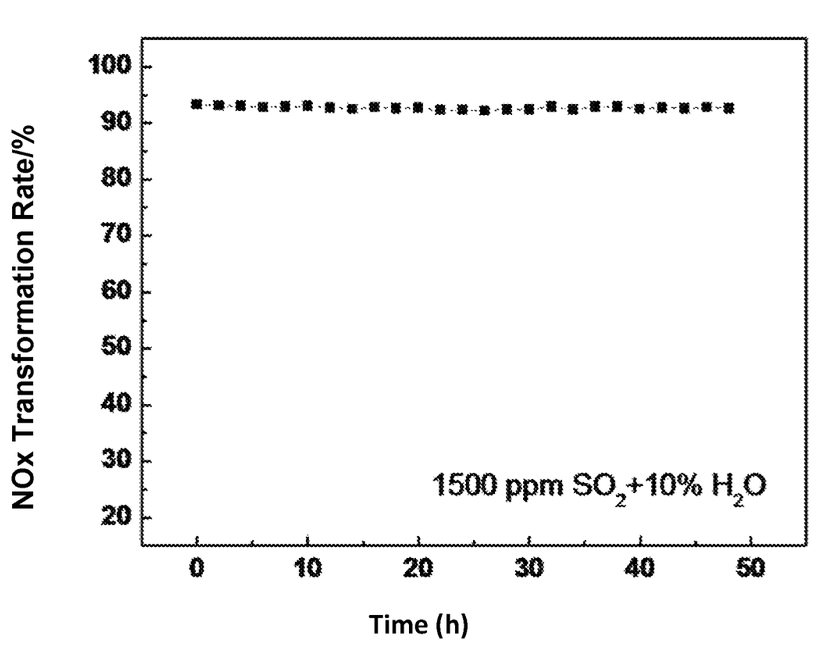
FIG. 1 shows a curve of the effect of 10% steam and 1500 ppm sulfur dioxide on the denitration activities of the honeycomb catalyst of Embodiment 10 at a test temperature of 300° C., where the abscissa represents reaction time (h) and the ordinate represents NOx conversion rate (%).

The water resistance and sulfur poisoning resistance of the honeycomb-type catalyst is tested under the following conditions: 500 ppm nitrogen monoxide, 500 ppm ammonia gas, 1500 ppm sulfur dioxide, 10% steam, 10% oxygen, the reaction equilibrium gas being nitrogen, the catalyst loading being 90 ml, and the reaction space velocity being 6000 $h^{-1}$; change in denitration efficiency of the honeycomb-type catalyst over time is tested under the reaction condition that temperature is held at 300° C. As shown in FIG. 1, the catalyst can maintain the NOx conversion rate over 90% within 48 h in the presence of 10% water vapor and 1500 ppm sulfur dioxide, indicating that the catalyst has strong water resistance and sulfur poisoning resistance.

Embodiment 11

Step (1) is implemented in the following way: adding 61.4 g of ferrous sulfate ($FeSO_4.7H_2O$) to 2800.0 g of deionized water and stirring until ferrous sulfate is completely dissolved; adding 400.0 g of Beta molecular sieves (the molar ratio of $SiO_2$ to $Al_2O_3$ is 28) and stirring for 4.5 h in a 60° C. constant-temperature water bath; and adding 84.0 g of Brij 78 and mixing for 40 min by using a JRJ300-S digital shear emulsification mixer. Herein, the mass of Fe in the ferric solution is 3.0% of the mass of the molecular sieves.

Step (2) is implemented in the following way: adding 392.9 g of copper sulfate ($CuSO_4.5H_2O$), 75.4 g of titanium oxysulfate ($TiOSO_4$) and 41.6 g of ammonium heptamolybdate ($(NH_4)_6Mo_7O_{24}.4H_2O$) into 6774.4 g of deionized water (the mass fraction of the solutes is 7%) and then stirring until they are completely dissolved to obtain a solution, marked as Solution A; adding 471.5 g of liquid sodium potassium silicate ($SiO_2$: 26.0%, $Na_2O$: 6.5%, $K_2O$: 6.3%, modulus: 2.5-2.7) into 748.1 g of deionized water (the mass fraction of the solute is 15%), and then stirring until the sodium potassium silicate is completely dissolved to obtain a solution, marked as Solution B; and adding Solution B dropwise into Solution A while stirring, adjusting the pH value of the system to 8-8.5 with a 15% $Na_2CO_3$ solution, adding 80.0 g of graphite with the mass being 25% of the total mass of oxides, and carrying out an aging reaction for 3 h in a 70° C. constant-temperature water bath.

Step (3) is implemented in the following way: filtering the slurry obtained in step (2) and washing with water until the electrical conductivity of the filtrate is less than 500 μs/cm; adding the obtained filter cake into the molecular sieve slurry obtained in step (1) and stirring and mixing for 2 h at room temperature; then, transferring to a rotary evaporator to evaporate most of water out of the material at a water bath temperature of 80° C. at a degree of vacuum of −0.85 Mpa to −0.95 Mpa until the material is viscous; and drying the obtained product at 140° C. for 18 h and then calcining in a muffle furnace at 450° C. for 3 h, wherein the heating-up rate of the muffle furnace is 1° C./min. Thus, the active component of the molecular sieve-multiple oxide composite denitration catalyst of the present invention is obtained.

In this embodiment, the molar ratio of Cu to Si to Ti to Mo in the multiple oxides is 1:1.3:0.3:0.15, and the mass ratio of the multiple oxides to the molecular sieves is 0.8:1.

Step (4) is implemented in the following way: pulverizing the active component obtained in step (3) with an RT-04SF-type high-speed pulverizer and sieving so that the particle size becomes smaller than 45 μm (325 meshes); mixing 600.0 g of the pulverized active component, 1320.0 g of titanium dioxide, 336.0 g of attapulgite clay, 43.2 g of hydroxypropyl methyl cellulose, 24.0 g of polyethylene oxide, 14.4 g of *sesbania* powder and 7.2 g of stearic acid for 30 min by using a QLJ-10L-type powerful mixer; and stirring 36.0 g of glycerol and 1520.0 g of deionized water uniformly, adding this into the material, mixing and stirring for 10 min, adding 144.0 g of ceramic fibers and 80.0 g of deionized water, mixing until the fibers are completely broken and the material becomes uniform paste (the paste is finally mixed to have a moisture content of 34%-35%), and staling the paste in a ziplock bag for 36 h in a sealed environment.

Step (5) is implemented in the following way: using a TLJ-40-type vacuum mixing extruder to extrude the material staled in step (4) into a 3 cm*3 cm (4*4 pores) honeycomb-type catalyst and then drying and calcining to obtain a molecular sieve-multiple oxide composite integral extrusion type denitration catalyst. Samples are dried in a BPS100CL constant temperature and humidity chamber at 30° C. under a humidity of 80% for 18 h, at 40° C. under a humidity of 70% for 12 h, at 50° C. under a humidity of 60% for 12 h, at 60° C. under a humidity of 50% for 12 h, at 70° C. under a humidity of 40% for 6 h, and at 80° C. under a humidity of 35% for 6 h, respectively, and then dried in a 100° C. oven for 8 h. Finally, the samples are calcined in the muffle furnace at 550° C. for 4 h, wherein the heating up rate of the muffle furnace is 1° C./min. The calcined samples are cut into 10 cm in length for activity testing.

The activity of the honeycomb-type catalyst is tested under the following conditions: 500 ppm nitrogen monoxide, 500 ppm ammonia gas, 500 ppm sulfur dioxide, 10% steam, 10% oxygen, the reaction equilibrium gas being nitrogen, the catalyst loading being 90 ml, and the reaction space velocity being 6000 $h^{-1}$. Table 2 shows the NOx conversion rates of the honeycomb-type catalyst at the following eight temperatures: 250° C., 270° C., 300° C., 320° C., 350° C., 370° C., 400° C. and 420° C.

Embodiment 12

This embodiment differs from Embodiment 11 in the molecular sieves and ion exchange metal used in step (1). Details are specified as follows:

Step (1) is implemented in the following way: adding 35.0 g of ferrous acetate (Fe(CH3COO)$_2$) and 4.92 g of manganese acetate (Mn(CH3COO)$_2$.4H$_2$O) into 2800.0 g of deionized water and stirring until they are completely dissolved; adding 400.0 g of Beta molecular sieves (the molar ratio of $SiO_2$ to $Al_2O_3$ is 25) and stirring for 4.5 h in a 60° C. constant-temperature water bath; and adding 84.0 g of Brij 78 and mixing for 40 min by using a JRJ300-S digital shear emulsification mixer. Herein, the mass of Fe and Mn in the Fe—Mn solution is 3.0% of the mass of the molecular sieves and the molar ratio of Fe to Mn is 1:0.1.

The activity of the honeycomb-type catalyst is tested under the following conditions: 500 ppm nitrogen monoxide, 500 ppm ammonia gas, 500 ppm sulfur dioxide, 10% steam, 10% oxygen, the reaction equilibrium gas being nitrogen, the catalyst loading being 90 ml, and the reaction space velocity being 6000 $h^{-1}$. Table 2 shows the NOx conversion rates of the honeycomb-type catalyst at the following eight temperatures: 250° C., 270° C., 300° C., 320° C., 350° C., 370° C., 400° C. and 420° C.

Embodiment 13

This embodiment differs from Embodiment 11 in that the multi-oxide precursor selected in step (2) includes a cerium source.

Step (2) is implemented in the following way: adding 288.3 g of copper sulfate (CuSO$_4$.5H$_2$O), 404.0 g of cerium sulfate (Ce(SO$_4$)$_2$.4H$_2$O), 69.2 g of titanium oxysulfate (TiOSO$_4$) and 38.2 g of ammonium heptamolybdate ((NH$_4$)$_6$Mo$_7$O$_{24}$.4H$_2$O) into 10624.6 g of deionized water (the mass fraction of the solutes is 7%) and then stirring until they are completely dissolved to obtain a solution, marked as Solution A; adding 432.4 g of liquid sodium potassium silicate ($SiO_2$: 26.0%, $Na_2O$: 6.5%, $K_2O$: 6.3%, modulus: 2.5-2.7) into 686.1 g of deionized water (the mass fraction of the solute is 15%), and then stirring until the sodium potassium silicate is completely dissolved to obtain a solution, marked as Solution B; and adding Solution B dropwise into Solution A while stirring, adjusting the pH value of the system to 8-8.5 with a 15% $Na_2CO_3$ solution, adding 80.0 g of graphite with the mass being 25% of the total mass of oxides, and carrying out an aging reaction for 3 h in a 70° C. constant-temperature water bath.

In this embodiment, the molar ratio of Cu to Ce to Si to Ti to Mo in the multiple oxides is 0.8:0.2:1.3:0.3:0.15, and the mass ratio of the multiple oxides to the molecular sieves is 0.8:1.

The activity of the honeycomb-type catalyst is tested under the following conditions: 500 ppm nitrogen monoxide, 500 ppm ammonia gas, 500 ppm sulfur dioxide, 10% steam, 10% oxygen, the reaction equilibrium gas being nitrogen, the catalyst loading being 90 ml, and the reaction space velocity being 6000 $h^{-1}$. Table 2 shows the NOx conversion rates of the honeycomb-type catalyst at the following eight temperatures: 250° C., 270° C., 300° C., 320° C., 350° C., 370° C., 400° C. and 420° C.

Embodiment 14

Step (1) is implemented in the following way: adding 36.7 g of copper chloride (CuCl$_2$.2H$_2$O) and 5.3 g of manganese chloride(MnCl$_2$.4H$_2$O) into 3600.0 g of deionized water and stirring until they are completely dissolved; adding 200.0 g of SSZ-39 molecular sieves (the molar ratio of $SiO_2$ to $Al_2O_3$ is 25) and 200.0 g of Zeolite Beta molecular sieves (the molar ratio of $SiO_2$ to $Al_2O_3$ is 12) and stirring for 3 h in a 70° C. constant-temperature water bath; and adding 180.0 g of Span40 and mixing for 30 min by using a JRJ300-S digital shear emulsification mixer. Herein, the mass of Cu and Mn in the mixed solution is 3.8% of the mass of the molecular sieves and the molar ratio of Cu to Mn is 1:0.13.

Step (2) is implemented in the following way: adding 72.6 g of aluminum sol ($Al_2O_3$: 20%) and 379.4 g of titanium sol ($TiO_2$: 15%) into 3866.2 g of deionized water, adding 574.7 g of cerium sulfate ($Ce(SO_4)_2 \cdot 4H_2O$) and 103.3 g of sodium molybdate ($Na_2MoO_4 \cdot 2H_2O$), and stirring to obtain a uniform solution (the mass fraction of the solutes is 15%), marked as Solution A; adding 341.4 g of sodium type silica sol (solid content<30%) into 1707.0 g of deionized water (the mass fraction of the solute is 5%), and then stirring to obtain a uniform solution, marked as Solution B; and adding Solution A dropwise to Solution B while stirring, adjusting the pH value of the system to 8-8.5 with a 30% ammonium carbonate solution, and then adding 48.0 g of carbon blacks with the mass being 10% of the total mass of oxides, and finally carrying out an aging reaction for 3 h in an 80° C. constant-temperature water bath.

Step (3) is implemented in the following way: filtering the slurry obtained in step (2) and washing with water until the electrical conductivity of the filtrate is less than 500 μs/cm; adding the obtained filter cake to the molecular sieve slurry obtained in step (1) and stirring and mixing for 1 h at room temperature; then, transferring to a rotary evaporator to evaporate most of water out of the material at a water bath temperature of 75° C. at a degree of vacuum of −0.85 Mpa to −0.95 Mpa until the material is viscous; and drying the obtained product at 130° C. for 20 h and then calcining in a muffle furnace at 350° C. for 5 h, wherein the heating-up rate of the muffle furnace is 1° C./min. Thus, the molecular sieve-multiple oxide composite denitration catalyst active component of the present invention is obtained.

In this embodiment, the molar ratio of Ce to Al to Ti to Si to Mo in the multiple oxides is 1:0.2:0.5:1.2:0.3, and the mass ratio of the multiple oxides to the molecular sieves is 1.2:1.

Step (4) is implemented in the following way: pulverizing the active component obtained in step (3) with an RT-04SF-type high-speed pulverizer and sieving so that the particle size becomes smaller than 45 μm (325 meshes); mixing 840.0 g of the pulverized active component, 1200.0 g of titanium-tungsten powder, 240.0 g of kaolin, 28.8 g of hydroxypropylmethyl cellulose, 48.0 g of polyethylene oxide, 16.8 g of activated carbons and 6.0 g of stearic acid for 30 min by using a QLJ-10L-type powerful mixer; and stirring 42.0 g of glycerol and 1520.0 g of deionized water uniformly, adding into the material, mixing and stirring for 10 min, adding 120.0 g of glass fibers and 80.0 g of deionized water, mixing until the fibers are completely broken and the material becomes uniform paste (the paste is finally mixed to have a moisture content of 34%-35%), and staling the paste in a ziplock bag for 28 h in a sealed environment.

Step (5) is implemented in the following way: using a TLJ-40-type vacuum mixing extruder to extrude the material staled in step (4) into a 3 cm*3 cm (4*4 pores) honeycomb-type catalyst and then drying and calcining to obtain a molecular sieve-multiple oxide composite integral extrusion type denitration catalyst. Samples are dried in a BPS100CL constant temperature and humidity chamber at 30° C. under a humidity of 80% for 16 h, at 40° C. under a humidity of 70% for 12 h, at 50° C. under a humidity of 60% for 12 h, at 60° C. under a humidity of 50% for 12 h, at 70° C. under a humidity of 40% for 6 h, and at 80° C. under a humidity of 35% for 6 h, respectively, and then dried in a 100° C. oven for 8 h. Finally, the samples are calcined in the muffle furnace at 550° C. for 4 h, wherein the heating up rate of the muffle furnace is 1° C./min. The calcined samples are cut into 10 cm in length for activity testing.

The activity of the honeycomb-type catalyst is tested under the following conditions: 500 ppm nitrogen monoxide, 500 ppm ammonia gas, 500 ppm sulfur dioxide, 10% steam, 10% oxygen, the reaction equilibrium gas being nitrogen, the catalyst loading being 90 ml, and the reaction space velocity being 6000 $h^{-1}$. Table 2 shows the NOx conversion rates of the honeycomb-type catalyst at the following eight temperatures: 250° C., 270° C., 300° C., 320° C., 350° C., 370° C., 400° C. and 420° C.

Embodiment 15

This embodiment differs from Embodiment 14 in the molecular sieves, ion exchange metal and proportions used in step (1).

Step (1) is implemented in the following way: adding 24.1 g of Manganese chloride ($MnCl_2 \cdot 4H_2O$) and 22.7 g of Cerium chloride ($CeCl_3 \cdot 7H_2O$) into 3600.0 g of deionized water and stirring until they are completely dissolved; adding 300.0 g of SSZ-16 molecular sieves (the molar ratio of $SiO_2$ to $Al_2O_3$ is 15) and 100.0 g of Zeolite Y molecular sieves (the molar ratio of $SiO_2$ to $Al_2O_3$ is 10) and stirring for 3 h in a 70° C. constant-temperature water bath; and adding 180.0 g of Span40 and mixing for 30 min by using a JRJ300-S digital shear emulsification mixer. Herein, the mass of Mn and Ce in the mixed solution is 3.8% of the mass of the molecular sieves and the molar ratio of Mn to Ce is 1:0.5.

The activity of the honeycomb-type catalyst is tested under the following conditions: 500 ppm nitrogen monoxide, 500 ppm ammonia gas, 500 ppm sulfur dioxide, 10% steam, 10% oxygen, the reaction equilibrium gas being nitrogen, the catalyst loading being 90 ml, and the reaction space velocity being 6000 $h^{-1}$. Table 2 shows the NOx conversion rates of the honeycomb-type catalyst at the following eight temperatures: 250° C., 270° C., 300° C., 320° C., 350° C., 370° C., 400° C. and 420° C.

TABLE 1

NOx conversion rates of the stripe-shaped catalysts

| Embodiments | NOx conversion rates | | | | | | | |
|---|---|---|---|---|---|---|---|---|
| | 250° C. | 270° C. | 300° C. | 320° C. | 350° C. | 370° C. | 400° C. | 420° C. |
| Embodiment 1 | 80.3 | 85.6 | 93.2 | 95.4 | 96.2 | 97.3 | 95.6 | 94.5 |
| Comparison Embodiment 1 | 56.6 | 69.2 | 85.0 | 86.6 | 88.5 | 85.1 | 84.6 | 82.4 |

TABLE 1-continued

NOx conversion rates of the stripe-shaped catalysts

| Embodiments | NOx conversion rates | | | | | | | |
|---|---|---|---|---|---|---|---|---|
| | 250° C. | 270° C. | 300° C. | 320° C. | 350° C. | 370° C. | 400° C. | 420° C. |
| Comparison Embodiment 2 | 59.8 | 73.1 | 87.7 | 87.9 | 90.3 | 87.5 | 85.2 | 82.3 |
| Embodiment 2 | 80.1 | 83.3 | 86.6 | 93.7 | 94.5 | 95.2 | 95.5 | 93.2 |
| Embodiment 3 | 86.3 | 89.1 | 95.6 | 98.3 | 99.5 | 99.3 | 98.8 | 97.9 |
| Embodiment 4 | 80.8 | 82.9 | 84.9 | 87.4 | 89.0 | 90.1 | 89.9 | 88.8 |
| Embodiment 5 | 83.4 | 86.3 | 90.6 | 93.1 | 96.2 | 97.8 | 97.5 | 96.3 |
| Embodiment 6 | 85.2 | 89.1 | 93.2 | 94.5 | 97.3 | 98.1 | 98.3 | 96.7 |

TABLE 2

NOx conversion rates of the plate-type and honeycomb-type catalysts

| Embodiments | NOx conversion rates | | | | | | | |
|---|---|---|---|---|---|---|---|---|
| | 250° C. | 270° C. | 300° C. | 320° C. | 350° C. | 370° C. | 400° C. | 420° C. |
| Embodiment 7-plate type | 80.7 | 84.9 | 88.8 | 91.1 | 92.3 | 93.0 | 91.5 | 88.9 |
| Embodiment 7-honeycomb type | 81.2 | 86.6 | 90.3 | 92.1 | 93.9 | 94.8 | 93.6 | 90.5 |
| Embodiment 8-plate type | 80.9 | 87.8 | 90.1 | 92.2 | 95.9 | 97.7 | 95.4 | 92.4 |
| Embodiment 8-honeycomb type | 82.3 | 88.0 | 91.2 | 93.4 | 97.8 | 98.9 | 97.6 | 94.8 |
| Embodiment 9-plate type | 81.5 | 87.7 | 90.6 | 94.2 | 96.3 | 96.1 | 95.9 | 93.8 |
| Embodiment 9-honeycomb type | 83.9 | 89.9 | 93.4 | 96.7 | 98.1 | 98.3 | 96.8 | 94.9 |
| Embodiment 10-plate type | 82.0 | 88.1 | 90.5 | 93.8 | 95.7 | 95.4 | 94.9 | 92.1 |
| Embodiment 10-honeycomb type | 83.1 | 89.7 | 92.8 | 95.9 | 98.6 | 97.9 | 94.5 | 93.1 |
| Embodiment 11-honeycomb type | 84.9 | 89.3 | 92.2 | 94.8 | 97.1 | 98.3 | 97.5 | 94.1 |
| Embodiment 12-honeycomb type | 85.6 | 90.1 | 93.0 | 96.6 | 98.3 | 98.9 | 98.0 | 96.4 |
| Embodiment 13-honeycomb type | 85.1 | 89.5 | 93.6 | 95.6 | 97.7 | 99.0 | 97.3 | 95.6 |
| Embodiment 14-honeycomb type | 80.2 | 87.4 | 90.7 | 93.7 | 94.4 | 96.3 | 95.5 | 92.3 |
| Embodiment 15-honeycomb type | 85.2 | 89.4 | 91.7 | 95.0 | 98.1 | 98.6 | 97.5 | 94.3 |

It can be seen from the data in Table 1 and Table 2 that the molecular sieve-multiple oxide composite integral extrusion type denitration catalyst prepared in the present invention has a higher NOx conversion rate within the temperature range of 250° C.-420° C. in the presence of water and sulfur dioxide.

In summary, compared with the prior art, the molecular sieve-multiple oxide composite denitration catalyst prepared by the preparation method provided in the present invention has good resistance to water and sulfur poisoning, and is a vanadium-free and environment-friendly denitration catalyst which can be applied to flue gas denitration of stationary sources such as industrial boilers and power plants.

Finally, it should be noted that the above embodiments are merely intended to illustrate the technical solutions of the present invention rather than to limit the scope of the present invention. It would be understood by those skilled in the art that various modifications and variations may be made in form and detail based on the teaching of the present invention, without departing from the scope of the present invention as defined in the following claims, all of which are within the scope of the present invention. The protection scope of the present invention is subject to the claims.

What is claimed is:
1. A method for preparing a molecular sieve-multiple oxide composite integral extrusion type denitration catalyst, comprising the following steps:
   (1) mixing a metal salt solution of one or two selected from the group consisting of manganese, iron, cobalt, nickel, copper, and cerium with molecular sieves; and after an ion exchange reaction, adding a surfactant and simultaneously carrying out shear emulsification and dispersion treatment to obtain an ion-exchanged molecular sieve slurry;
   (2) preparing an acidic precursor solution from a mixture of a metal salt of one or two selected from the group consisting of manganese, iron, cobalt, nickel, copper, and cerium with one or more selected from the group consisting of an aluminum source, a titanium source, and a zirconium source; preparing an alkaline precursor solution from an alkaline silicon source; and mixing the acidic precursor solution and the alkaline precursor solution uniformly to obtain a mixed solution or slurry;

(3) adding an alkaline compound solution into the mixed solution or slurry obtained in step (2) to adjust a pH value of the mixed solution or slurry to alkaline; adding a pore-forming agent; and carrying out an aging reaction, filtering, washing with water, and removing filtrate to obtain a filter cake, which is a multi-oxide precursor;

(4) adding the ion-exchanged molecular sieve slurry obtained in step (1) into the multi-oxide precursor obtained in step (3); stirring and mixing; and then carrying out vacuum dewatering, drying, and calcining to obtain a molecular sieve-multiple oxide composite denitration catalyst active component; and (5) pulverizing and sieving the composite denitration catalyst active component obtained in step (4); then mixing with a titanium-based support, an inorganic binder, an organic binder, a structure enhancer, a molding pore-forming agent, a lubricant, and water; kneading into a paste; staling; and carrying out integral extrusion molding, drying, and calcining to obtain an integral extrusion type denitration catalyst.

2. The method for preparing a molecular sieve-multiple oxide composite integral extrusion type denitration catalyst according to claim 1, wherein in step (1), the metal salt of one or two selected from the group consisting of manganese, iron, cobalt, nickel, copper, and cerium is a soluble metal salt selected from the group consisting of a metal acetate, a metal nitrate, a metal sulfate, and a metal hydrochloride; the mass of the one or two selected from the group consisting of manganese, iron, cobalt, nickel, copper, and cerium in the metal salt is 0.5%-8% of the mass of the molecular sieves; the framework topological structure of the molecular sieves is one selected from the group consisting of AEI, AFX, BEA, CHA, DDR, ERI, FAU, FER, GIS, KFI, LEV, LTA, MEL, MFI, MOR, PAU, SAS, and a mixture thereof; the liquid-solid mass ratio of the metal salt solution to the molecular sieves is 2-50:1; the ion exchange reaction is carried out at 25-95° C. and lasts for 0.5-8 h; the surfactant is a cationic surfactant, an anionic surfactant, or a nonionic surfactant; the surfactant has a concentration of 0.5%-10% by mass; and the shear emulsification and dispersion treatment lasts for 10-40 min.

3. The method for preparing a molecular sieve-multiple oxide composite integral extrusion type denitration catalyst according to claim 2, wherein the molecular sieve is an aluminosilicate molecular sieve, a silicoaluminophosphate molecular sieve, or an aluminum phosphate molecular sieve; and a type of the molecular sieve is one of a hydrogen type molecular sieve, an ammonium type molecular sieve, an alkali metal type molecular sieve, or an alkaline earth metal type molecular sieve.

4. The method for preparing a molecular sieve-multiple oxide composite integral extrusion type denitration catalyst according to claim 3, wherein the molar ratio of $SiO_2$ to $Al_2O_3$ in the aluminosilicate molecular sieves is 5-100; the mass of silicon in the silicoaluminophosphate molecular sieves is 1%-25% of the mass of the molecular sieves; and the type of the molecular sieve is a hydrogen type molecular sieve.

5. The method for preparing a molecular sieve-multiple oxide composite integral extrusion type denitration catalyst according to claim 2, wherein the framework topological structure of the molecular sieves is one or more selected from the group consisting of SAPO-18, SSZ-39, SAPO-56, SSZ-16, Zeolite Beta, SAPO-34, SSZ-13, SAPO-44, ZSM-58, ZSM-34, Zeolite X, Zeolite Y, SAPO-37, ZSM-35, Zeolite P, SAPO-43, ZK-5, SAPO-35, Zeolite A, ZSM-11, ZSM-5, Zeolite Mordenite, ECR-18, and SSZ-73; the cationic surfactant is a quaternary ammonium salt; the anionic surfactant is a carboxylate, a sulfate, a sulfonate, or a phosphate; and the nonionic surfactant is a long-chain alkane epoxy ethylene ether, a long-chain phenol epoxy ethylene ether, or an sorbitan ester, or polyethylene oxide-polypropylene oxide block copolymer.

6. The method for preparing a molecular sieve-multiple oxide composite integral extrusion type denitration catalyst according to claim 1, wherein in step (2), the acidic precursor solution and the alkaline precursor solution are mixed by way of adding the acidic precursor solution dropwise into the alkaline precursor solution, or adding the alkaline precursor solution dropwise into the acidic precursor solution, or simultaneously adding the acidic precursor solution and the alkaline precursor solution into the same vessel; the acidic precursor solution and the alkaline precursor solution have concentrations of 5%-20% by mass; the atomic mole fraction of the one or two selected from the group consisting of manganese, iron, cobalt, nickel, copper, and cerium in the metal salt is 1; the atomic mole fractions of aluminum, titanium, zirconium, and silicon in the aluminum source, the titanium source, the zirconium source, and the alkaline silicon source are 0-0.5, 0-0.5, 0-0.5, and 1-2, respectively; the acidic precursor solution further comprises a metal salt of one or two or three selected from the group consisting of a magnesium source, a calcium source, an indium source, a tin source, a lanthanum source, a tungsten source, and a molybdenum source; and the total atomic mole fraction of magnesium, calcium, indium, tin, lanthanum, tungsten, and molybdenum in the one or two or three of the magnesium source, calcium source, indium source, tin source, lanthanum source, tungsten source and/or molybdenum source is 0.1-0.5.

7. The method for preparing a molecular sieve-multiple oxide composite integral extrusion type denitration catalyst according to claim 6, wherein the aluminum source is aluminum sol, aluminum chloride, aluminum sulfate, or aluminum nitrate; the titanium source is titanium sol, titanium sulfate, or titanium oxysulfate; the zirconium source is zirconium sol, zirconium oxychloride, zirconium sulfate, zirconium nitrate, or zirconyl nitrate; the alkaline silicon source is alkaline silica sol, or a soluble silicate; the magnesium source is a soluble acetate, nitrate, sulfate, or hydrochloride; the calcium source is a soluble acetate, nitrate, sulfate, or hydrochloride; the indium source is a soluble acetate, nitrate, sulfate, or hydrochloride; the tin source is a soluble acetate, nitrate, sulfate, or hydrochloride; the lanthanum source is a soluble acetate, nitrate, sulfate, or hydrochloride; the tungsten source is sodium tungstate, or ammonium tungstate; and the molybdenum source is sodium molybdate, or ammonium molybdate.

8. The method for preparing a molecular sieve-multiple oxide composite integral extrusion type denitration catalyst according to claim 1, wherein in step (3), the alkaline compound is sodium hydroxide, potassium hydroxide, ammonium hydroxide, urea, ammonium carbonate, ammonium bicarbonate, ammonium sulfate, ammonium bisulfate, ammonium oxalate, sodium carbonate, sodium bicarbonate, potassium carbonate, or potassium bicarbonate; the alkaline compound solution has a concentration of 5%-30% by mass; the pH value of the mixed solution or slurry obtained in step (2) after having adjusted by the alkaline compound solution is 7.5-9; the pore-forming agent is activated carbons, carbon blacks, nano carbon materials, or graphite; the aging reaction is carried out at 40-95° C. and lasts for 0.5-12 h; the filtrate has an electrical conductivity lower than 500 μs/cm; and the ratio of the total mass of multiple oxides calculated on the basis of the masses of oxides in the multi-oxide precursor to the mass of the molecular sieves in step (1) is 0.5-1.5:1.

9. The method for preparing a molecular sieve-multiple oxide composite integral extrusion type denitration catalyst according to claim 1, wherein in step (4), the stirring and mixing lasts for 0.5-3 h; the vacuum dewatering is carried out at 75-85° C. at a degree of vacuum of −0.85 Mpa to −0.95 Mpa; the drying is carried out at 100-150° C. and lasts for 12-24 h; and the calcining is carried out at 350-450° C. and lasts for 2-6 h.

10. The method for preparing a molecular sieve-multiple oxide composite integral extrusion type denitration catalyst according to claim 1, wherein in step (5), the sieving is performed to ensure the particle size of the pulverized composite denitration catalyst active component obtained in step (4) to be smaller than 45 μm; the titanium-based support is titanium dioxide, titanium-silicon powder, titanium-tungsten powder, or titanium-tungsten-silicon powder; the inorganic binder is attapulgite clay, bentonite, montmorillonite, or kaolin; the organic binder is aminocarboxymethyl cellulose, hydroxypropyl methyl cellulose, or polyethylene oxide; the structure enhancer is glass fiber, carbon fiber, or ceramic fiber; the molding pore-forming agent is sesbania powder, wood pulp, activated carbons, or carbon blacks; the lubricant is glycerin, lactic acid, or stearic acid; the weight ratio of the composite denitration catalyst active component to the titanium-based support to the inorganic binder to the structure enhancer is (10-40):(40-70):(10-30):(3-8); based on the total weight of the composite denitration catalyst active component, the titanium-based support, the inorganic binder and the structure enhancer, the weight percents of the organic binder, the molding pore-forming agent, the lubricant and water are 1.2%-3.8%, 0.4%-1.0%, 0.8%-2.5% and 51.5%-66.7% of the total weight, respectively; the staling refers to allowing the paste to rest in a sealed environment for 15-36 h; the catalyst is integrally extruded and formed into one of a granular type, a clover shape, a hollow cylindrical shape, an integrally extruded honeycomb type and an integral extruded plate type; the drying is carried out at 35° C.-80° C. under a humidity of 80%-35% and lasts for 20-80 h; and the calcining is carried out at 500° C.-650° C. and lasts for 2-6 h.

* * * * *